(12) United States Patent
Ozaki et al.

(10) Patent No.: US 10,846,840 B2
(45) Date of Patent: Nov. 24, 2020

(54) IMAGE RECOGNITION DEVICE

(71) Applicant: DENSO CORPORATION, Kariya (JP)

(72) Inventors: Yoshinori Ozaki, Kariya (JP);
Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 16/342,672

(22) PCT Filed: Oct. 12, 2017

(86) PCT No.: PCT/JP2017/037006
§ 371 (c)(1),
(2) Date: Apr. 17, 2019

(87) PCT Pub. No.: WO2018/074319
PCT Pub. Date: Apr. 26, 2018

(65) Prior Publication Data
US 2020/0051230 A1     Feb. 13, 2020

(30) Foreign Application Priority Data

Oct. 20, 2016    (JP) .................................. 2016-206047

(51) Int. Cl.
*G06K 9/00*     (2006.01)
*G06T 7/00*     (2017.01)
*G06T 7/20*     (2017.01)

(52) U.S. Cl.
CPC ........ *G06T 7/0002* (2013.01); *G06K 9/00362* (2013.01); *G06K 9/00805* (2013.01); *G06T 7/20* (2013.01); *G06T 2207/30196* (2013.01); *G06T 2207/30261* (2013.01)

(58) Field of Classification Search
CPC .. G06K 9/00362; G06K 9/00805; G06T 7/20; G06T 1/00; G06T 7/00; B60R 21/00; G08G 1/16
See application file for complete search history.

(56) References Cited

U.S. PATENT DOCUMENTS 5,109,425 A * 4/1992 Lawton ................... G06T 7/262
348/25
6,370,475 B1 * 4/2002 Breed ................... G01S 13/931
701/301

(Continued)

FOREIGN PATENT DOCUMENTS

JP            5423631 B2    2/2014

*Primary Examiner* — Samir A Ahmed
(74) *Attorney, Agent, or Firm* — Maschoff Brennan

(57) ABSTRACT

An image recognition device includes an image acquisition unit, a moving object detection unit, and a pedestrian detection unit. The image acquisition unit acquires consecutive captured images of a surrounding of a vehicle from a camera mounted to the vehicle. The moving object detection unit calculates a moving amount based on consecutive captured images in time series acquired by the image acquisition unit to detect a moving object from the captured images. The pedestrian detection unit detects a pedestrian using an identifier for identifying a pedestrian from the captured images acquired by the image acquisition unit. The pedestrian detection unit relaxes a detection criterion for detecting a pedestrian using the identifier in a region of a captured image where the moving object is detected.

6 Claims, 4 Drawing Sheets

(56) References Cited

U.S. PATENT DOCUMENTS

| | | | |
|---|---|---|---|
| 6,766,038 B1* | 7/2004 | Sakuma | G01P 3/806 |
| | | | 340/933 |
| 6,882,303 B2* | 4/2005 | Samukawa | G01S 17/931 |
| | | | 342/70 |
| 2009/0108109 A1* | 4/2009 | Mori | B05B 5/1675 |
| | | | 239/694 |
| 2012/0147188 A1* | 6/2012 | Yokochi | B60R 1/00 |
| | | | 348/148 |
| 2014/0142798 A1* | 5/2014 | Guarnizo Martinez | |
| | | | G08G 1/16 |
| | | | 701/23 |
| 2014/0152488 A1* | 6/2014 | Baba | G01S 13/867 |
| | | | 342/70 |
| 2015/0248586 A1* | 9/2015 | Gaidon | G06K 9/00711 |
| | | | 382/103 |
| 2016/0117841 A1* | 4/2016 | Fukuman | G06K 9/6293 |
| | | | 382/103 |
| 2017/0140229 A1* | 5/2017 | Ogata | B60W 30/0956 |
| 2019/0279374 A1* | 9/2019 | Kim | G06T 7/80 |

* cited by examiner

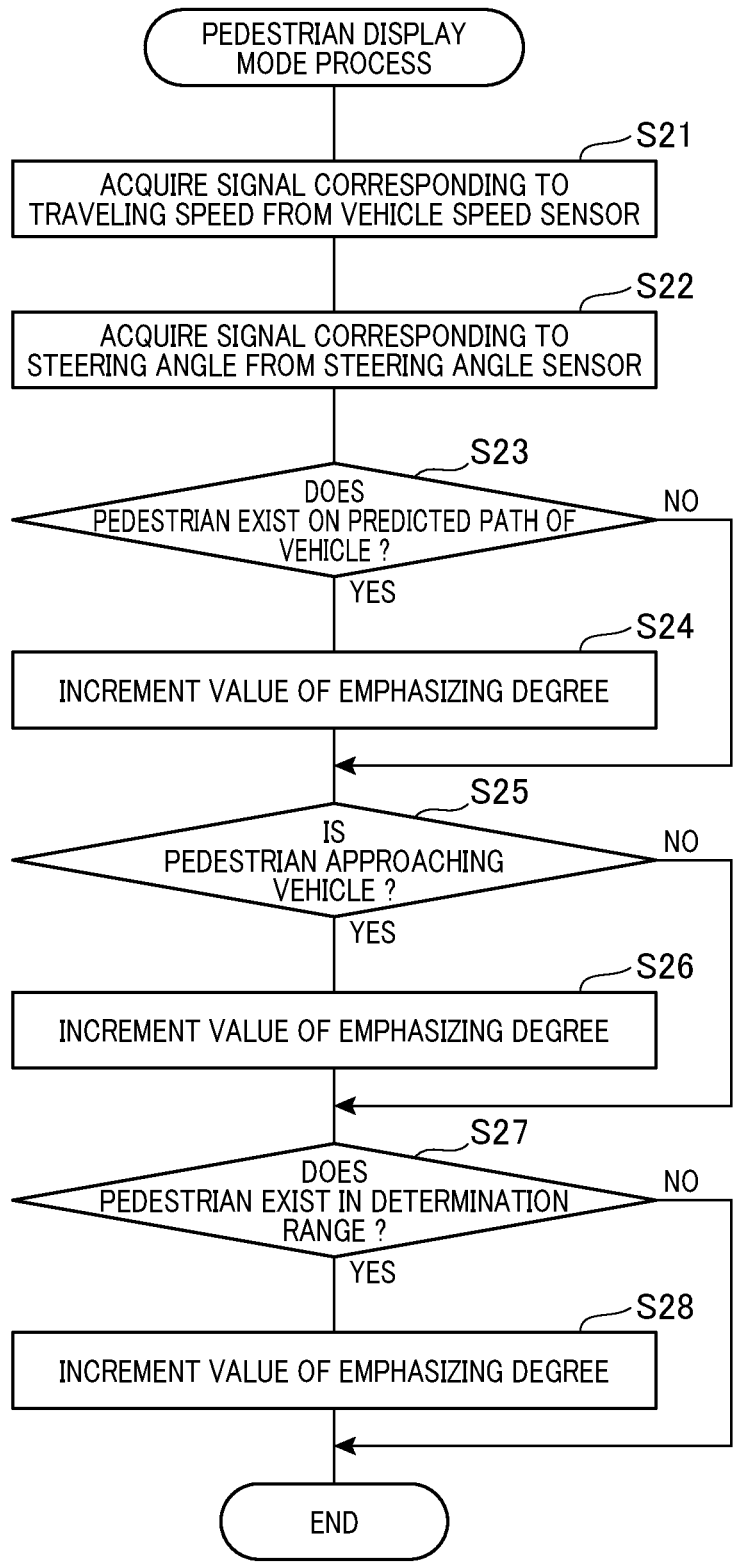

IMAGE RECOGNITION DEVICE

CROSS-REFERENCE TO RELATED APPLICATION

The present application is a national stage application of PCT Application No. PCT/JP2017/037006, filed on Oct. 12, 2017, which claims the priority based on Japanese Patent Application No. 2016-206047 filed in Japan Patent Office on Oct. 20, 2016, and Japanese Patent Application No. 2016-206047 is incorporated in the present international application by reference in its entirety. Also, any applications for which a foreign or domestic priority claim is identified in the Application Data Sheet as filed with the present application are hereby incorporated by reference under 37 CFR 1.57.

TECHNICAL FIELD

The present disclosure relates to an image recognition device installed in a vehicle.

BACKGROUND ART

Patent Literature 1 discloses an image recognition device that detects an object of detection such as a pedestrian from a captured image captured by an onboard camera and outputs the detection result to a display. The image recognition device checks the feature value data of the object extracted from the captured image against the optimum model among learning models to determine whether the feature value data of the object matches the feature value data of a pedestrian. The learning models are identifiers that are created by learning the feature value data using sample images and stored in advance. If the object that matches the feature value data of a pedestrian is detected, a frame-shaped image is displayed overlapping the captured image to encompass the image representing the detected object, that is, the pedestrian.

CITATION LIST

Patent Literature

[PTL 1] Japanese Patent No. 5423631

SUMMARY OF THE INVENTION

Close examinations carried out by the inventors has revealed a problem that it is technically difficult to previously assume and accurately detect pedestrians in various situations, with the technique of detecting pedestrians using the identifiers as described above. For example, pedestrians who look different from typical pedestrians, such as a pedestrian pushing a stroller, tend to have lower match rate with the identifiers of the typical pedestrians and are less likely to be detected as a pedestrian.

One aspect of the present disclosure is to provide an image recognition device that has improved accuracy in detecting pedestrians.

One aspect of the present disclosure is an image recognition device including an image acquisition unit, a moving object detection unit, and a pedestrian detection unit. The image acquisition unit acquires consecutive captured images of a surrounding of a vehicle from a camera mounted on the vehicle. The moving object detection unit calculates a moving amount based on the consecutive captured images acquired by the image acquisition unit to detect a moving object from the captured images. The pedestrian detection unit detects a pedestrian using an identifier for identifying a pedestrian from the captured images acquired by the image acquisition unit. The pedestrian detection unit relaxes a detection criterion for detecting the pedestrian using the identifier in a region of a captured image where the moving object is detected.

This configuration detects moving objects and pedestrians from the captured images. If a moving object is detected, the detection criterion for detecting a pedestrian using the identifier is relaxed in the region of a captured image where the moving object is detected. Thus, as compared with a case for detecting a pedestrian using a constant detection criterion regardless of whether the moving object is detected, this configuration reduces a possibility of a pedestrian being undetected while inhibiting objects that are not pedestrians from being erroneously detected as pedestrians. This improves the accuracy in detecting pedestrians.

BRIEF DESCRIPTION OF THE DRAWINGS

FIG. 4 A flowchart of a pedestrian display mode process.

DESCRIPTION OF THE EMBODIMENTS

Hereinafter, an exemplary embodiment of the present disclosure will be described with reference to the drawings.

1. Configuration

Figure 1:
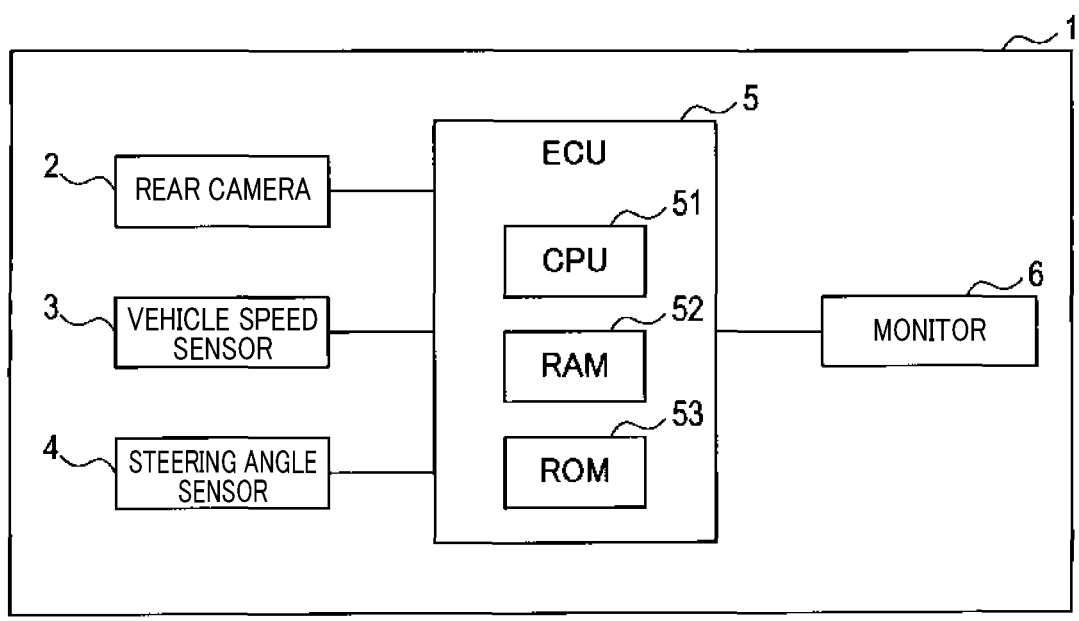
FIG. 1 A block diagram illustrating the configuration of an image recognition system.

An image recognition system 1 shown in FIG. 1 includes a rear camera 2, a vehicle speed sensor 3, a steering angle sensor 4, an ECU 5, and a monitor 6. A vehicle that is equipped with the image recognition system 1 is hereinafter also referred to as a "host vehicle".

The rear camera 2 is mounted on the rear section of the host vehicle and captures images of the rear of the host vehicle. The rear camera 2 outputs a signal representing each captured image to the ECU 5. The host vehicle may be equipped with cameras other than the rear camera 2.

The vehicle speed sensor 3 is a sensor for detecting the traveling speed of the host vehicle. The vehicle speed sensor 3 outputs a signal corresponding to the detected traveling speed to the ECU 5.

The steering angle sensor 4 is a sensor for detecting the steering angle of the steering wheel of the host vehicle. The steering angle sensor 4 outputs a signal corresponding to the detected steering angle to the ECU 5.

The ECU 5 includes a known microcomputer including, for example, a CPU 51, a RAM 52, and a ROM 53. The CPU 51 executes programs stored in the ROM 53, which is a non-transitory tangible storage medium. When any of the programs is executed, a method corresponding to the program is executed. More specifically, the ECU 5 executes a pedestrian detection process shown in FIG. 2, which will be discussed below, in accordance with a program corresponding to the process. The ECU 5 outputs a signal representing the captured image to the monitor 6. The ECU is an abbreviation of Electronic Control Unit.

The monitor 6 is a display for displaying images and is located at a position where the driver of the host vehicle can see.

2. Process

Next, the pedestrian detection process executed by the ECU 5 will be described using the flowchart of FIG. 2. The pedestrian detection process is periodically executed while the shift position of a shift lever is in reverse.

At S11, the ECU 5 acquires images captured by the rear camera 2.

At S12, the ECU 5 detects a moving object from the acquired images. More specifically, the moving object is detected by calculating the moving amount of the object in the acquired images using the known optical flow method based on the currently acquired captured image and the previously acquired consecutive images in time series.

Figure 3:
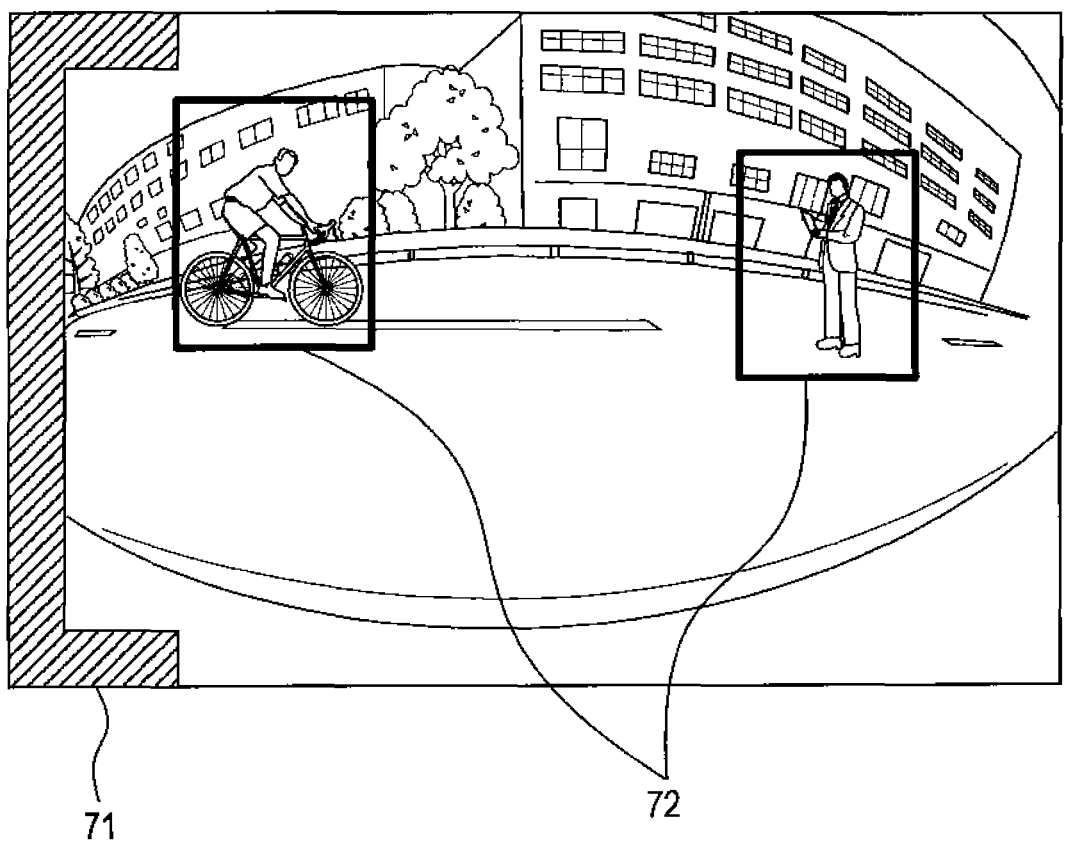
FIG. 3 A diagram illustrating one example of a captured image shown on a display.

If the moving object is detected at S12, the ECU 5 proceeds to S13 and displays a moving object emphasizing image 71, which is a U-shaped thick line, on the left end of the captured image as shown in FIG. 3 to emphasize that the moving object has been detected.

After S13 is executed, the ECU 5 proceeds to S14, relaxes a detection criterion for detecting a pedestrian using identifiers in the region of the captured image where the moving object is detected, that is, a certain region including the moving object, and proceeds to S15. Relaxing the detection criterion refers to lowering a threshold value, which serves as a criterion for determining the match rate with the identifiers used for detecting a pedestrian, in a case in which the moving object is detected compared with a case in which the moving object is not detected.

If the moving object is not detected at S12 described above, the ECU 5 proceeds to S15.

At S15, the ECU 5 detects a pedestrian from the acquired captured images. More specifically, the known pattern matching method detects a pedestrian when the match rate of the identifiers for identifying a pedestrian with an object in the captured image is greater than or equal to the threshold value serving as the criterion. If the moving object is not detected at S12 described above, a pedestrian is detected when the match rate is greater than or equal to a first threshold value, which is a normal value of the criterion. If the moving object is detected at S12 described above, a pedestrian is detected when the match rate is greater than or equal to a second threshold value, which is a relaxed value of the criterion in the region where the moving object is detected.

If no pedestrian is detected at S15, the ECU 5 terminates the pedestrian detection process.

If a pedestrian is detected at S15 described above, the ECU 5 proceeds to S16 and executes the pedestrian display mode process.

The pedestrian display mode process executed by the ECU 5 will now be described using the flowchart of FIG. 4. The pedestrian display mode process is a process for changing, in accordance with the behavior of the detected pedestrian, a display mode for determining how to highlight the pedestrian at S17 of FIG. 2, which will be discussed below.

At S21, the ECU 5 acquires a signal corresponding to the detected traveling speed from the vehicle speed sensor 3.

At S22, the ECU 5 acquires a signal corresponding to the detected steering angle from the steering angle sensor 4.

At S23, the ECU 5 determines whether the pedestrian detected at S15 described above is on a predicted path, which is the path along which the host vehicle is predicted to travel. The predicted path of the host vehicle is generated based on the signals from the vehicle speed sensor 3 and the steering angle sensor 4 using, for example, Ackermann-Jeantaud scheme. The ECU 5 subsequently determines whether the pedestrian exists on the predicted path of the host vehicle based on the captured image acquired from the rear camera 2.

At S23, if it is determined that the pedestrian exists on the predicted path of the host vehicle, the ECU 5 proceeds to S24, increments the value of the emphasizing degree by one, and proceeds to S25. The emphasizing degree is the degree of emphasis regarding the display mode when highlighting the pedestrian. The value of the emphasizing degree is initialized to zero at the start of the pedestrian display mode process.

If it is determined that the pedestrian is not on the predicted path of the host vehicle at S23 described above, the ECU 5 skips S24 described above and proceeds to S25.

At S25, the ECU 5 determines whether the pedestrian detected at S15 described above is approaching the host vehicle. Whether the pedestrian is approaching the host vehicle is determined in accordance with the moving amount calculated based on the acquired consecutive images in time series acquired from the rear camera 2.

If it is determined that the pedestrian is approaching the host vehicle at S25, the ECU 5 proceeds to S26, increments the value of the emphasizing degree by one, and proceeds to S27.

If it is determined that the pedestrian is not approaching the host vehicle at S25 described above, the ECU 5 skips S26 described above and proceeds to S27.

At S27, the ECU 5 determines whether the pedestrian detected at S15 described above exists in a determination range, which is a predetermined range with respect to the host vehicle. The distance between the pedestrian and the host vehicle is identified in accordance with the height of the lower end position of the pedestrian in the captured image acquired from the rear camera 2. That is, the further the position of the pedestrian from the host vehicle, the higher the lower end position of the pedestrian in the captured image tends to be. Thus, whether the pedestrian exists in the determination range is determined in accordance with the height of the lower end position of the pedestrian in the captured image.

If it is determined that the pedestrian exists in the determination range at S27, the ECU 5 proceeds to S28, increments the value of the emphasizing degree by one, and terminates the pedestrian display mode process. Subsequently, the ECU 5 proceeds to S17 of FIG. 2.

If it is determined that the pedestrian does not exist in the determination range at S27 described above, the ECU 5 skips S28 and terminates the pedestrian display mode process. Subsequently, the ECU 5 proceeds to S17 of FIG. 2.

Figure 2:
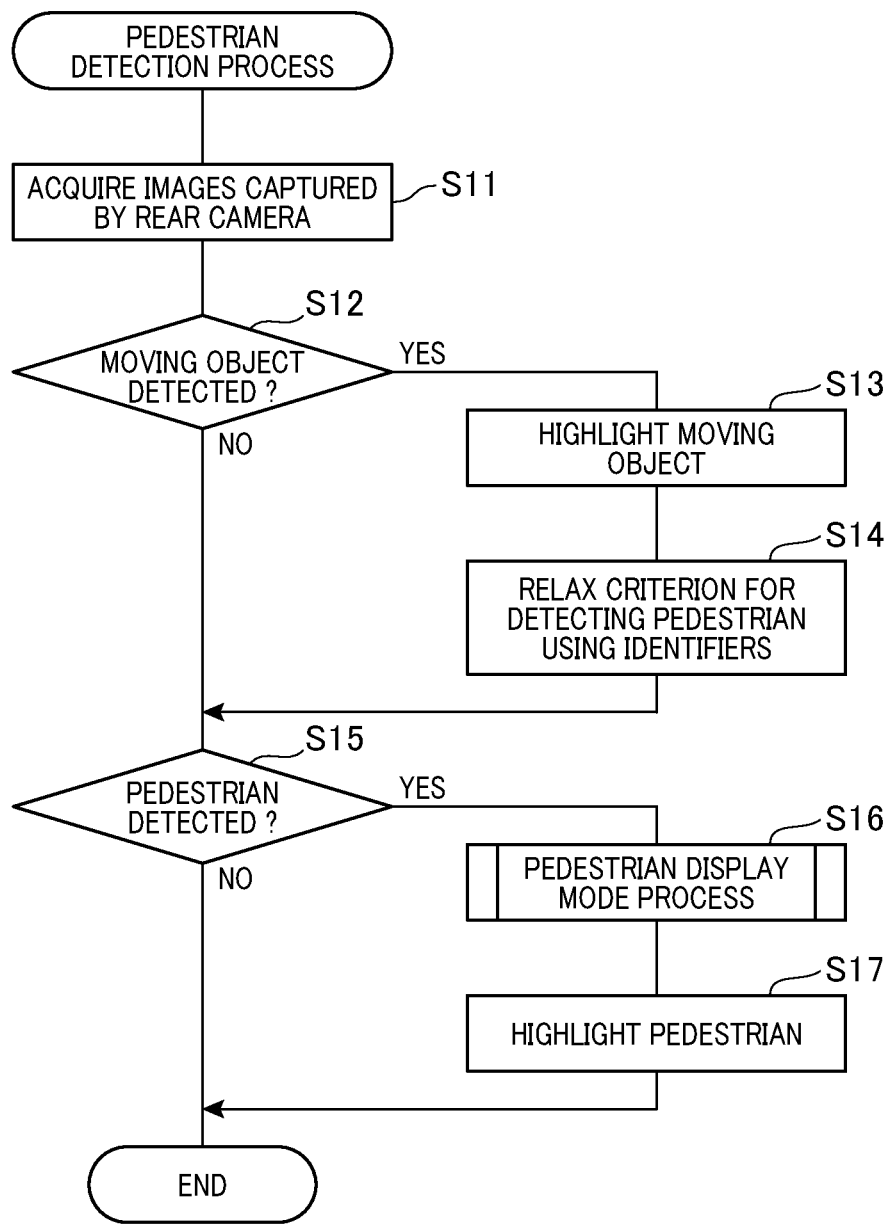
FIG. 2 A flowchart of a pedestrian detection process.

The ECU 5 returns to the flowchart of FIG. 2, which illustrates the pedestrian detection process executed by the ECU 5. At S17, the ECU 5 determines the display mode when highlighting the pedestrian in accordance with the value of the emphasizing degree determined in the above-described pedestrian display mode process. Subsequently, as shown in FIG. 3, a frame-shaped image, which is a pedestrian emphasizing image 72, is displayed on the captured image to encompass the pedestrian detected from the captured image, so that the pedestrian is emphasized. More specifically, for example, the color of the pedestrian emphasizing image 72 is changed in accordance with the value of the emphasizing degree. For example, the pedestrian emphasizing image 72 is changed to green if the value of the emphasizing degree is 0, to yellow if the value of the emphasizing degree is 1, to orange if the value of the emphasizing degree is 2, and to red if the value of the emphasizing degree is 3. Subsequently, the pedestrian detection process is terminated.

3. Advantages

The above-described embodiment has the following advantages.

(3a) According to the present embodiment, the ECU 5 detects moving objects and pedestrians from the captured images. If a moving object is detected, the detection criterion for detecting a pedestrian using the identifiers is relaxed in the region of a captured image where the moving object is detected. Thus, as compared with a case for detecting a pedestrian using a constant detection criterion regardless of whether the moving object is detected, the above-described embodiment reduces a possibility of a pedestrian being undetected while inhibiting objects that are not pedestrians from being erroneously detected as pedestrians. This improves the accuracy in detecting pedestrians.

(3b) In the present embodiment, the ECU 5 displays the captured image in which the pedestrian is emphasized on the monitor 6. This alerts the driver to the pedestrian.

(3c) In the present embodiment, the ECU 5 emphasizes a moving object other than pedestrians in a displaying mode different from that of the pedestrians. This alerts the driver to a pedestrian in a mode distinguishable from a moving object other than pedestrians.

(3d) In the present embodiment, the ECU 5 determines whether the pedestrian exists on the predicted path of the host vehicle. If it is determined that the pedestrian exists on the predicted path of the host vehicle, the ECU 5 increases the value of the emphasizing degree and emphasizes the pedestrian in a display mode different from that when it is determined that the pedestrian does not exist on the predicted path of the host vehicle. Thus, if the pedestrian exists on the predicted path of the host vehicle, the degree of emphasizing the pedestrian is enhanced to alert the driver.

(3e) In the present embodiment, the ECU 5 determines whether the pedestrian is approaching the host vehicle. If it is determined that the pedestrian is approaching the host vehicle, the ECU 5 increases the value of the emphasizing degree and emphasizes the pedestrian in a display mode different from that when it is determined that the pedestrian is not approaching the host vehicle. Thus, when the pedestrian at the rear of the host vehicle is approaching the host vehicle, the degree of emphasizing the pedestrian is enhanced to alert the driver.

(3f) In the present embodiment, the ECU 5 determines whether the pedestrian exists in the determination range with respect to the host vehicle. If it is determined that the pedestrian exists in the determination range, the ECU 5 increases the value of the emphasizing degree and emphasizes the pedestrian in a display mode different from that when it is determined that the pedestrian does not exist in the determination range. Thus, if the pedestrian exists in the determination range, the degree of emphasizing the pedestrian is enhanced to alert the driver.

In the present embodiment, the ECU 5 corresponds to an image recognition device, the monitor 6 corresponds to a display, the rear camera 2 corresponds to a camera, S11 corresponds to a process serving as an image acquisition unit, S12 corresponds to a process serving as a moving object detection unit, and S14 and S15 correspond to processes serving as a pedestrian detection unit. S13 and S17 correspond to processes serving as a display processing unit, S23 corresponds to a process serving as a path determination unit, S25 corresponds to a process serving as an approach determination unit, and S27 corresponds to a process serving as an existence determination unit.

4. Other Embodiments

The embodiment of the present disclosure has been described above. The present disclosure is not limited to the embodiment and can be implemented in various modifications.

(4a) In the above-described embodiment, moving objects and pedestrians at the rear of the host vehicle are detected based on the captured images acquired from the rear camera 2. However, detection of moving objects and pedestrians is not limited to the rear of the host vehicle. For example, moving objects and pedestrians that exist in front of the host vehicle may be detected based on the captured images acquired from a front camera.

(4b) In the above-described embodiment, moving objects other than pedestrians are highlighted by distinguishing from the pedestrians, but the emphasis on the display is not limited to this. For example, only the pedestrians may be emphasized.

(4c) The above-described embodiment shows one example of changing the display mode by changing the color of the pedestrian emphasizing image 72 in accordance with the behavior of the pedestrian detected based on the captured images. However, the display mode of the pedestrian emphasizing image 72 is not limited to this. For example, a display mode in which the pedestrian emphasizing image 72 is changed into other forms may be employed.

(4d) The above-described embodiment alerts the driver by highlighting the moving objects and the pedestrians detected based on the captured images on the monitor 6. However, the alerting of the driver is not limited to the display. For example, the driver may be alerted by generating a sound such as a beep or a voice.

(4e) In the above-described embodiment, some or all of the functions executed by the ECU 5 may be configured as hardware devices, such as one or more integrated circuits (ICs) or the like.

(4f) Besides the above-described ECU 5, the present disclosure may be implemented in various forms including the image recognition system 1, which includes the ECU 5 as one of the components of the system, a program for causing a computer to execute the pedestrian detection process, a non-transitory tangible storage medium such as a semiconductor memory including the ROM 53 that stores the program, and a method for detecting pedestrians.

(4g) In the above-described embodiment, multiple functions of one component may be performed by multiple components, or one function of one component may be performed by multiple components. Alternatively, multiple functions of the multiple components may be performed by one component, or one function performed by the multiple components may be performed by one component. Part of the configuration of the above-described embodiment may be omitted. The embodiment of the present disclosure includes any aspect included in the technical ideas specified by the language of the claims.

The invention claimed is:

1. An image recognition device comprising:
    an image acquisition unit that acquires consecutive captured images of a surrounding of a vehicle from a camera mounted to the vehicle;
    a moving object detection unit that calculates a moving amount based on the consecutive captured images acquired by the image acquisition unit to detect a moving object from the captured images; and a pedestrian detection unit that detects a pedestrian using an identifier for identifying a pedestrian from the captured images acquired by the image acquisition unit, wherein the pedestrian detection unit relaxes a detection criterion for detecting a pedestrian using the identifier in a region of a captured image where the moving object is detected.

2. The image recognition device according to claim 1, further comprising a display processing unit that causes the captured image to be displayed on a display, wherein the display processing unit displays, on the display, the captured image in a display mode to emphasize the pedestrian detected by the pedestrian detection unit.

3. The image recognition device according to claim 2, wherein the display processing unit emphasizes the moving object other than the pedestrian detected by the moving object detection unit in an alternative display mode different from the display mode of the pedestrian detected by the pedestrian detection unit.

4. The image recognition device according to claim 2, further comprising a path determination unit that determines whether the pedestrian detected by the pedestrian detection unit exists on a predicted path, the predicted path being a path along which the vehicle is predicted to travel, wherein if it is determined that the pedestrian exists on the predicted path by the path determination unit, the display processing unit emphasizes the pedestrian in an alternative display mode different from the display mode when it is determined that the pedestrian does not exist on the predicted path.

5. The image recognition device according to claim 2, further comprising an approach determination unit that determines whether the pedestrian detected by the pedestrian detection unit is approaching the vehicle, wherein if it is determined that the pedestrian is approaching the vehicle by the approach determination unit, the display processing unit emphasizes the pedestrian in an alternative display mode different from the display mode when it is determined that the pedestrian is not approaching the vehicle.

6. The image recognition device according to claim 2, further comprising an existence determination unit that determines whether the pedestrian detected by the pedestrian detection unit exists in a determination range, the determination range being a predetermined range defined with respect to the vehicle, wherein if it is determined that the pedestrian exists in the determination range by the existence determination unit, the display processing unit emphasizes the pedestrian in an alternative display mode different from the display mode when it is determined that the pedestrian does not exist in the determination range.

* * * * *